United States Patent
Singh et al.

(10) Patent No.: US 9,222,763 B2
(45) Date of Patent: Dec. 29, 2015

(54) COORDINATE MEASURING MACHINE WITH CONSTRAINED COUNTERWEIGHT

(71) Applicant: Hexagon Metrology, Inc., North Kingstown, RI (US)

(72) Inventors: Gurpreet Singh, Providence, RI (US); John Langlais, Coventry, RI (US); Jie Zheng, Mansfield, MA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 376 days.

(21) Appl. No.: 13/782,732

(22) Filed: Mar. 1, 2013

(65) Prior Publication Data

US 2013/0227851 A1    Sep. 5, 2013

Related U.S. Application Data

(60) Provisional application No. 61/605,831, filed on Mar. 2, 2012, provisional application No. 61/605,829, filed on Mar. 2, 2012.

(51) Int. Cl.
*G01B 5/00* (2006.01)
*G01B 5/008* (2006.01)
*G01B 21/04* (2006.01)

(52) U.S. Cl.
CPC .............. *G01B 5/008* (2013.01); *G01B 5/0014* (2013.01); *G01B 21/042* (2013.01)

(58) Field of Classification Search
CPC ..... G01B 21/042; G01B 5/0014; G01B 5/008
USPC ........................................... 33/503, 1 M, 832
See application file for complete search history.

(56) References Cited

U.S. PATENT DOCUMENTS

| | | | |
|---|---|---|---|
| 4,253,342 A | 3/1981 | Uhing | 74/89 |
| 4,507,868 A | 4/1985 | Tuss | 33/1 M |
| 4,515,415 A | 5/1985 | Szenger | 308/6 R |
| 4,799,316 A | 1/1989 | Tuss | 33/503 |
| 4,835,871 A * | 6/1989 | Pesikov | G01B 5/0016 33/503 |
| 4,858,481 A | 8/1989 | Abraham | 74/89.15 |

(Continued)

FOREIGN PATENT DOCUMENTS

| | | | |
|---|---|---|---|
| DE | 10 2008 062 7 | 7/2010 | G01B 21/04 |
| DE | 10 2010 017 9 | 10/2011 | G01B 21/04 |

OTHER PUBLICATIONS

Authorized Officer: Schubert-Puschel, Sibylle European Patent Office, International Search Report—International Application No. PCT/US2013/028675, dated Jun. 14, 2013, together with the Written Opinion of the International Searching Authority, 11 pages.

(Continued)

*Primary Examiner* — Yaritza Guadalupe-McCall

(74) *Attorney, Agent, or Firm* — Sunstein Kann Murphy & Timbers LLP

(57) ABSTRACT

A coordinate measuring machine has a measuring member for measuring a workpiece, a counterweight to control movement of the measuring member, and a pulley and cable system coupling the measuring member with the counterweight. The coordinate measuring machine also has a guide track, where the counterweight is movably secured to the guide track. The guide track substantially limits counterweight movement, relative to the measuring member, to one dimension.

20 Claims, 7 Drawing Sheets

(56) References Cited

U.S. PATENT DOCUMENTS

| | | | | |
|---|---|---|---|---|
| 4,964,221 A | * | 10/1990 | Breyer et al. | 33/503 |
| 5,072,522 A | * | 12/1991 | Stott et al. | 33/503 |
| 5,339,531 A | | 8/1994 | Ogiwara | 33/503 |
| 6,058,618 A | | 5/2000 | Hemmelgarn et al. | 33/503 |
| 6,370,787 B1 | | 4/2002 | Kikuchi | 33/503 |
| 7,712,389 B2 | | 5/2010 | Wang | 74/89.23 |
| 2003/0106236 A1 | | 6/2003 | Jordil et al. | 33/832 |
| 2008/0072443 A1 | * | 3/2008 | Powell | 33/503 |
| 2010/0287786 A1 | * | 11/2010 | Biselx | 33/832 |
| 2011/0083334 A1 | * | 4/2011 | Eley | G01B 21/047 33/503 |
| 2013/0227851 A1 | * | 9/2013 | Singh et al. | 33/503 |

OTHER PUBLICATIONS

Opinion of the International Searching Authority, 11 pages.
European Patent Office Communication Pursuant to Rules 161(1) and 162 EPC pertaining to Application No. 13710935.1-1558, dated Oct. 15, 2014, 2 pages.
Kaminski Harmann Patentanwalte Response to Communication Pursuant to Rules 161(1) and 162 EPC dated Mar. 10, 2015, pertaining to Application No. 13710935.1-1558, 11 pages.

* cited by examiner

Cross-Section A-A

COORDINATE MEASURING MACHINE WITH CONSTRAINED COUNTERWEIGHT

PRIORITY

The present application claims priority from Provisional Application No. 61/605,829, titled "Coordinate Measuring Machine with Constrained Counterweight" and filed Mar. 2, 2012 and from Provisional Application No. 61/605,831, titled "Coordinate Measuring Machine with Support Beam Having Springs" and filed Mar. 2, 2012. These applications are incorporated by reference herein in their entirety.

FIELD OF THE INVENTION

The invention generally relates to coordinate measuring machines and, more particularly, the invention relates to more effectively controlling the movable ram in a coordinate measuring machine.

BACKGROUND OF THE INVENTION

Among other things, coordinate measuring machines ("CMMs," also known as surface scanning measuring machines) measure geometry and surface profiles, or verify the topography of known surfaces. For example, a CMM may measure the topological profile of a propeller to ensure that its surface is appropriately sized and shaped for its specified task (e.g., moving a 24-foot boat at pre-specified speeds through salt water).

To that end, conventional CMMs typically have a base directly connected with and supporting a movable assembly having a probe that directly contacts and moves along a surface of an object being measured. The base also supports the object being measured. The probe typically is movable upwardly and downwardly toward and away from the base (known in the art as "Z-axis movement"). Purity of the axis is important in obtaining accurate results.

SUMMARY OF THE INVENTION

In accordance with one embodiment of the invention, a coordinate measuring machine has a measuring member for measuring a workpiece, a motor for actuating the measuring member, a counterweight to control movement of the measuring member, and a pulley and cable system coupling the measuring member with the counterweight. The coordinate measuring machine also has a guide track, where the counterweight is movably secured to the guide track. The guide track substantially limits the counterweight movement, relative to the measuring member, to one dimension. The cable system substantially reduces errors from the counterweight to the measuring member. The guide track may include a rolling ring linear actuator that is disposed against a smooth rail or linear rail, or a threaded nut that is disposed against a threaded rail. In an embodiment, the guide track may include a first rail and a second rail, where the first rail is operatively coupled to the rolling ring linear actuator, and the second rail is operatively coupled to a linear guide. The counterweight and the measuring member may have generally similar mass.

The coordinate measuring machine also may have a base for supporting an object to be measured. In that case, the one dimension may be generally orthogonal to the plane of the base. Some embodiments also have a motor coupled with the counterweight, where the motor rotates a shaft to cause the counterweight to move in one linear dimension. Moreover, other embodiments also have a measuring track, where the measuring member is coupled with the measuring track to move in one linear dimension. In some embodiments, the motor may rotate the shaft through a second pulley system, which may include at least two pulleys coupled with a belt therebetween.

The measuring member and counterweight preferably are configured to move at substantially equal magnitudes but in opposite directions. Additionally, the counterweight illustratively is exterior to the guide track (i.e., it moves along the outside surface of the guide track). To measure certain objects, the measuring member may be formed at least in part from a ram and a probe head.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a coordinate measuring machine has a counterweight (coupled with a movable arm) that is constrained to move in one direction only. Accordingly, the counterweight should have negligible movement in other directions, providing smoother upward and downward movement for the arm (which may be a ram). This movement should improve controllability of the arm and, consequently, improve the performance of the overall machine. Details of illustrative embodiments are discussed below.

Figure 1A:
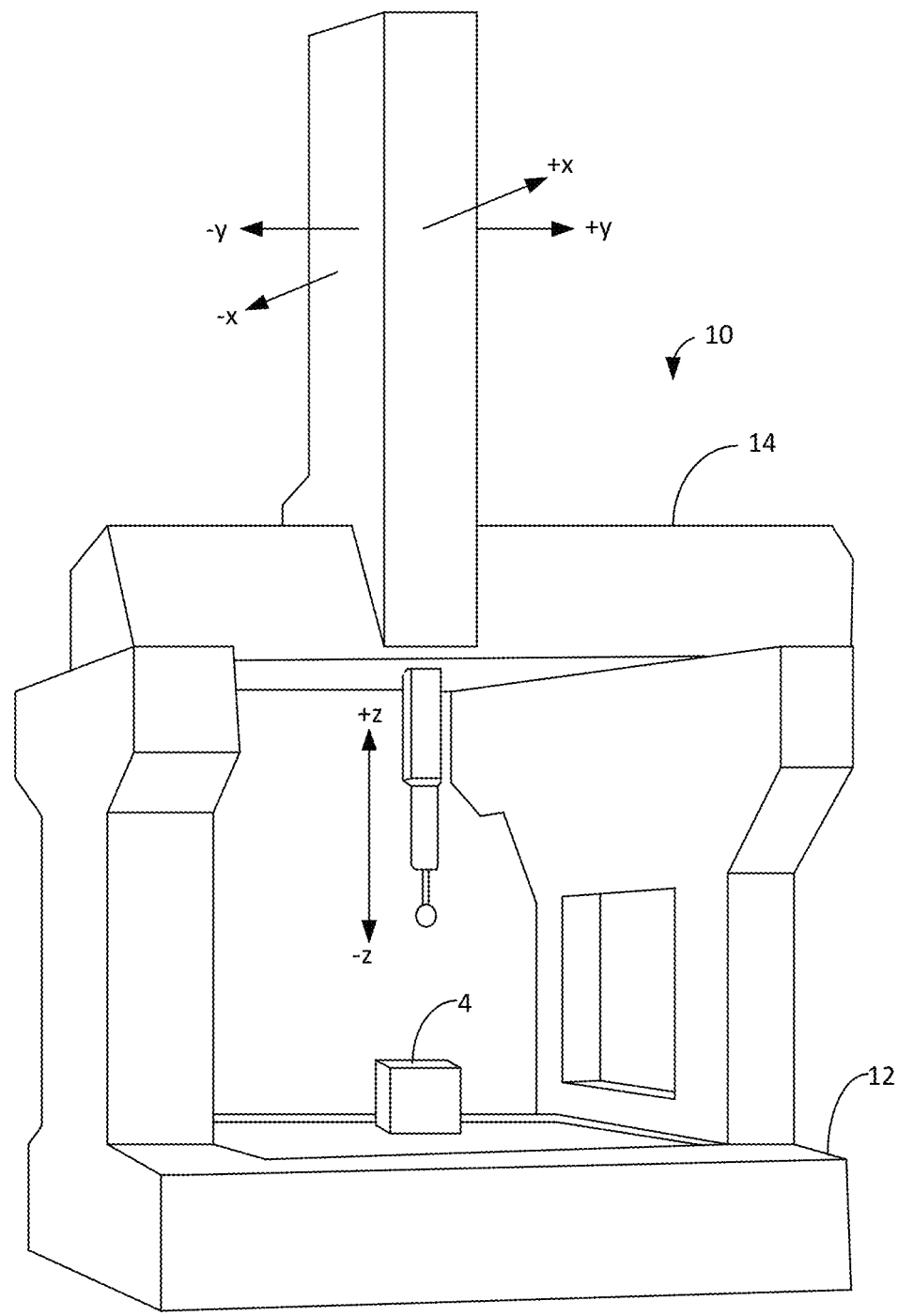
FIG. 1A schematically shows a coordinate measuring machine in accordance with illustrative embodiments.

FIG. 1A schematically shows a coordinate measuring machine (hereinafter "CMM 10") that may be configured in accordance with illustrative embodiments of the invention. As with other CMMs, the CMM 10 has a generally base (referred to herein as a "platform 12") for supporting an object 4 to be scanned, and a scanning apparatus 14 with a movable mechanism (e.g., 3-axis gantry) movably connected to the platform 12 for gathering topographical information about the supported object 4. The platform 12, which can be formed from any of a variety of materials, such as cement or granite, has an array of holes for fixedly securing the object to its top surface.

Figure 1B:
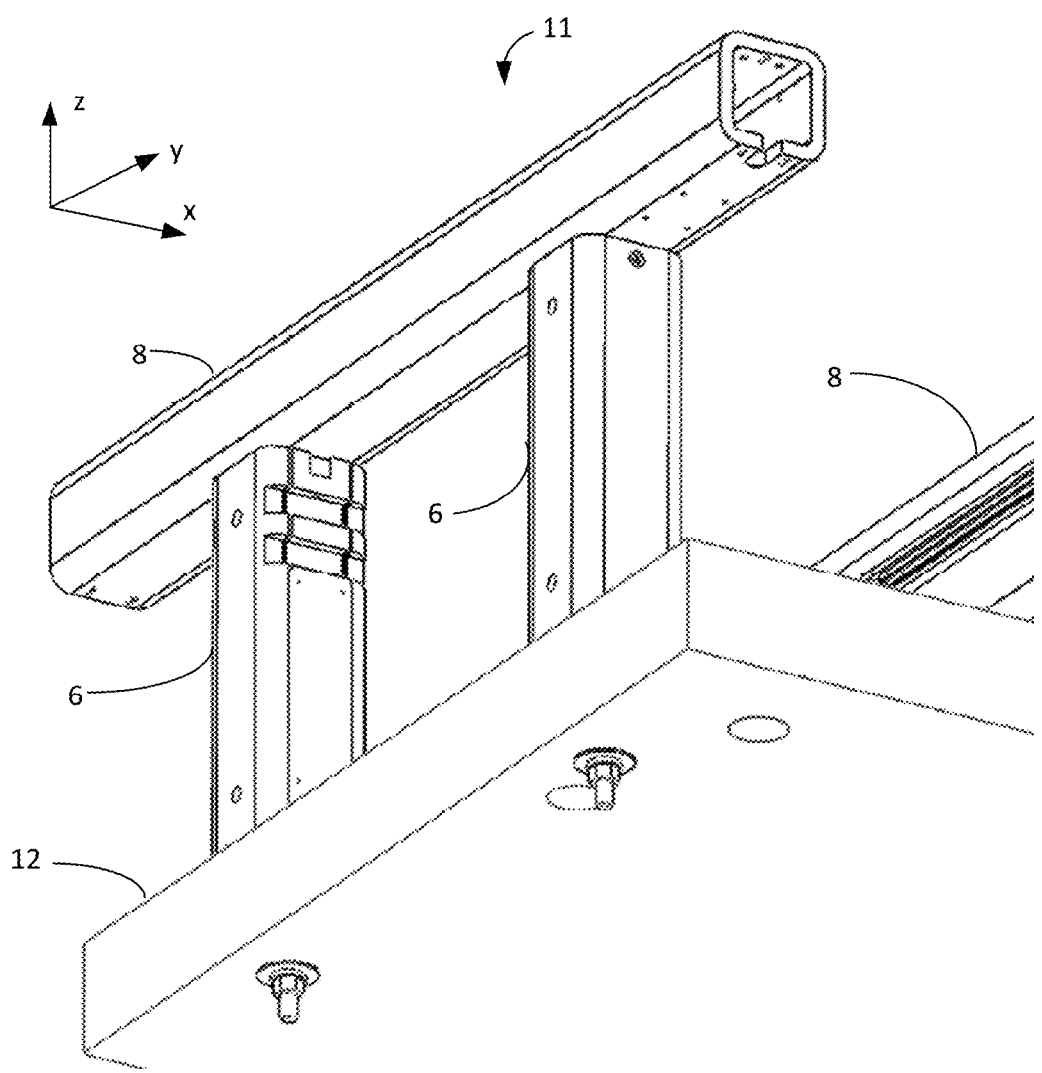
FIG. 1B schematically shows a portion of a coordinate measuring machine configured in accordance with illustrative embodiments of the invention.

FIG. 1B schematically shows a portion 11 of a coordinate measuring machine 10 configured in accordance with illustrative embodiments of the invention. The platform 12 may be fastened to support beams 6 that support cross-beams 8. The cross-beams 8 provide a support for a set of guide tracks for the X-direction and the Y-direction for the scanning apparatus 14 to seat.

Figure 2A:
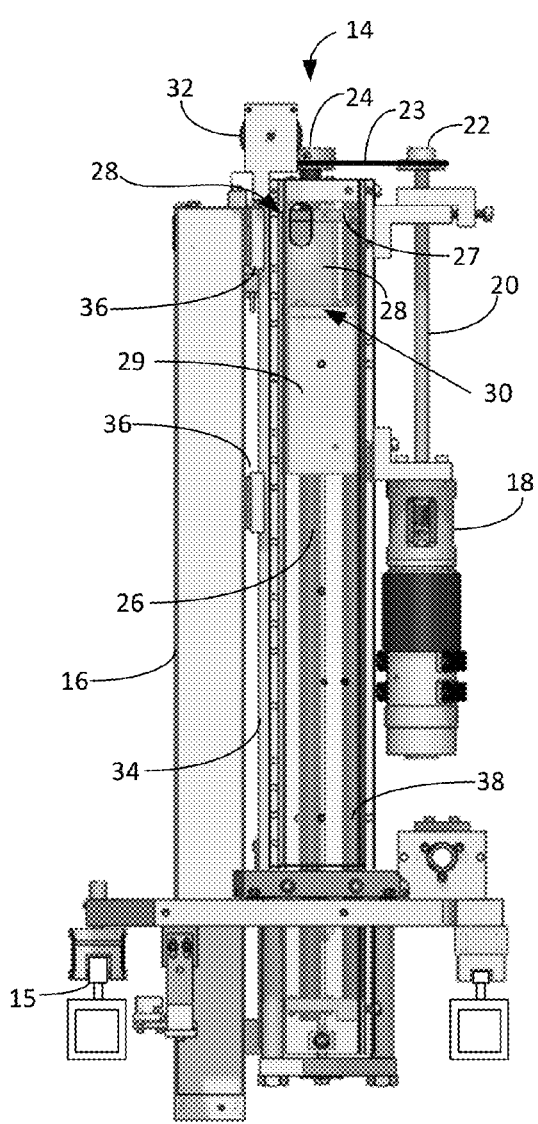
FIG. 2A schematically shows a scanning apparatus portion of the coordinate measuring machine that can be mounted to the portion shown in FIG. 1B.
Figure 2B:
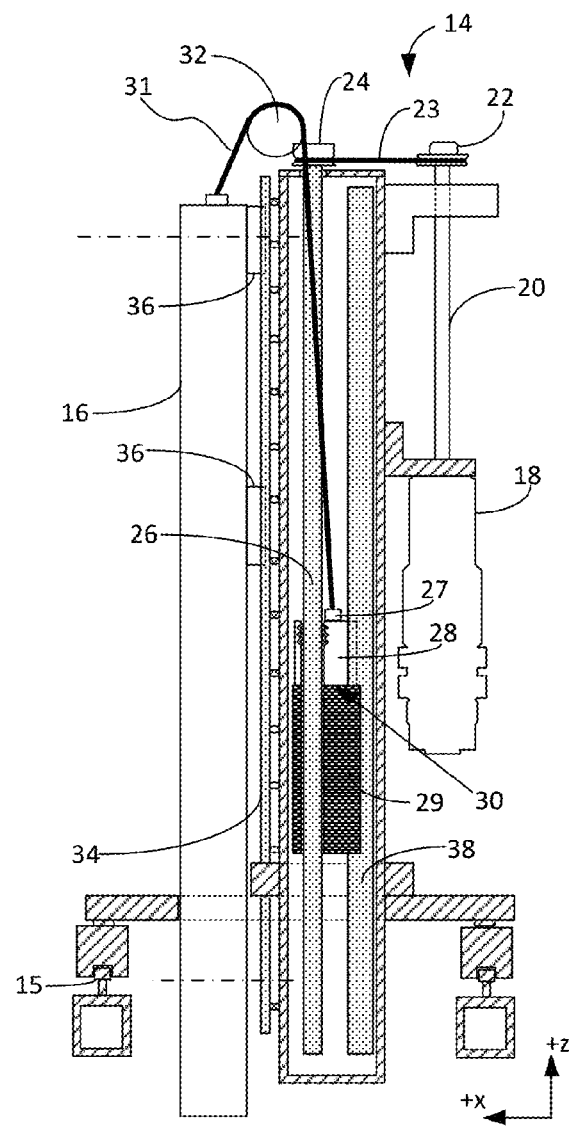
FIG. 2B schematically shows a cut-out view of the scanning apparatus of FIG. 2A.

To gather surface information about the object 4, the scanning apparatus 14 has a movable mechanism that contacts or probes the object 4. More specifically, FIGS. 2A-2B show this movable mechanism, which includes a scanning probe shaft 16 (also referred to as a "ram 16") that contacts or probes the object 4. The scanning apparatus 14 and the ram 16 are movable in three dimensions space—the X-direction (parallel to the width of the platform 12), the Y-direction (parallel to the length of the platform 12), and the Z-direction (toward and away from the top surface of the platform 12). To that end, the CMM 10 has a drive mechanism (not shown) that moves the entire scanning apparatus 14 in the Y-direction along, for example, the guide track 15. Among other things, the drive mechanism may include servo controllers and other precision movement equipment.

The ram 16 shown in FIG. 2A is configured to normally move in the Z-direction; namely toward and away from the platform 12 of the CMM 10. A sequence of linked components enables this movement. Specifically, the movable apparatus 14 has a motor 18 that rotates a first drive shaft 20 terminating at a first pulley 22. The motor 18 may be any conventional motor, such as a brushless DC electric motor, or an AC motor. The motor may be directly coupled to the first drive shaft 20 or a gearbox (not shown) may be disposed therebetween.

A first belt 23 connects the first pulley 22 with a second pulley 24 that is fixedly secured with a second drive shaft 26. Accordingly, rotation of the first pulley 22 causes the second pulley 24 to rotate, thus rotating the second drive shaft 26. The second drive shaft 26 operates in conjunction with a counterweight assembly 30 to translate the rotation movement to a linear motion that is constrained to the Z-direction. The counterweight assembly 30 may include a mounting plate 27 and a rotary-to-thrust assembly 28 fixedly secured with a counterweight 29. The counterweight 29 may be a static mass or a linear spring. The mounting plate 27 also provides a connecting point for the counterweight assembly 30 and the cable 31. Components of the counterweight assembly 30 may be fixedly secured to each other by any of various joining means, including, for example, fasteners such as bolt, screws, as well as welding.

The rotatory-to-thrust assembly 28 may engage the second drive shaft 26 to translate the rotation movement to a linear motion. In an illustrative embodiment, the rotary-to-thrust assembly 28 may be a rolling ring linear actuator, as describes in U.S. Pat. No. 4,253,342 (title "Arrangement for Transforming a Rotary Movement of a Smooth Shaft into a Thrust Movement of a Rolling Nut"). This patent is incorporated by reference in its entirety. In an embodiment, the rotary-to-thrust assembly 28 may be an Uhing linear drive Model RG. Such rolling ring linear actuators may have a rolling nut that engages the surface of the second drive shaft 26 at a bevel angle corresponding to a pitch value. The rotary-to-thrust assembly 28 may provide constraint to the counterweight assembly 30, including in the Y-direction and X-direction.

Alternatively, the second drive shaft 26 may have a threaded portion that mates in conjunction with a complementary threaded nut (as the rotary-to-thrust assembly 28) fixedly secured with the counterweight assembly 30. The threaded portion may operate in conjunction with threads fixedly secured with a counterweight assembly 30. The rotary-to-thrust assembly 28 may have a female bore with an internal threaded surface. This threaded surface may have a complementary shape to that of the threaded portion of the second drive shaft 26. For example, both may take on the form of a double helix.

Accordingly, among the various embodiments, rotation of the second drive shaft 26 in one direction (e.g., clockwise) may cause the counterweight 30 to move upwardly. In a complementary manner, rotation of the second drive shaft 26 in the opposite direction (e.g., counterclockwise) may cause the counterweight 30 to move downwardly. The motor 18 thus directly controls movement of the counterweight assembly 30 through its pulley 22, 24 and drive the shaft system. Of course, those skilled in the art understand that other arrangements may perform the same function.

As noted above, the movable mechanism has a ram 16 that moves toward and away from the platform 12 to measure an object 4. The counterweight assembly 30 controls this motion. To that end, the movable mechanism has a cable 31 extending between the top of the counterweight 30 and the top of the movable ram 16 via a third pulley 32. The third pulley 32 may be sized and positioned such that the cable 31 is generally vertical. As such, the cable 31 may be parallel to the longitudinal axis of the ram 16, the second drive shaft 26, and a second rail 38. Alternatively, the cable 31 may be non-vertical. The counterweight assembly 30 and ram 16 may be generally balanced to each other and thus may require less support to maintain a rigid structure necessary for repeatable measurement.

The movable ram 16 preferably is constrained to move in one dimension only. To that end, the movable member uses a first rail 34 that constrains movement of the ram 16 in all directions other than in the Z direction. In other words, the ram 16 only moves in the Z-direction relative to its other component, i.e., the system may move together in the X-direction and the Y-direction, but the ram 16 moves only in the Z-direction relative to the rest of its assembly. At least two carriages 36 coupled with the ram 16 have bearings or rollers (not shown) to make this movable connection. Any of various types of bearings may be employed, including roller bearing, ball bearings, clearance bearings, thrust bearings, air bearings, magnetic bearings, and fluid bearings. The bearings may be configured by conventional means known to those skilled in the art to address temperature differential.

In accordance with illustrative embodiments of the invention, the counterweight assembly 30 also has a similar arrangement for constraining its motion to one dimension only; namely, movement in the Z direction only. To that end, the counterweight assembly 30 has a second rail 38 to constrain movement in all directions other than the Z direction. The second rail 38 may be rounded or non-rounded. In a manner similar to the ram 16 (described in detail below), this motion is relative to the rest of the local assembly, including the shafts 20, 26, and the motor 18.

The counterweight assembly 30 operating with the second rail 38 may constrain movement in the Z-direction unless actuated—here, by way of rotation. As such, the actuation assembly may provide a passive bias for the pulley assembly even when at rest.

The bearings 40 may operate in conjunction with the rotary-to-thrust assembly 28 to constrain the assembly 30 to move only in the Z-direction. For example, the bearings 40 may constrain the motion of the counterweight assembly 30 generally in the X-direction. Then the rotary-to-thrust assembly 28 may constrain the motion of the counterweight 30 in various directions, including the Y-direction. Thus, only motion in the Z-direction is allowed.

In an illustrative embodiment, a pair of bearings 40 is mounted to opposing sides of the second rail 38. The pair of bearings 40 may be mounted at the mounting plate 27 and at the counterweight 29. Of course, other bearings configuration may be employ. For example, the bearings 40 may be mounted at other portions of the counterweight assembly, such as at the rotary-to-thrust assembly 28. Additional pairs of bearings may also be employed.

In balancing the mass of the ram 16 with the counterweight assembly 30, the power to operate (i.e., controllably move) the ram 16 for measurement may be reduced. As such, the motor 18 may only have to provide sufficient power to overcome i) the imbalance in inertia in the pulley-ram-counterweight system and a change in the potential energy thereof and ii) the friction between the various guides and pulley systems.

Figures 3A, 3B:
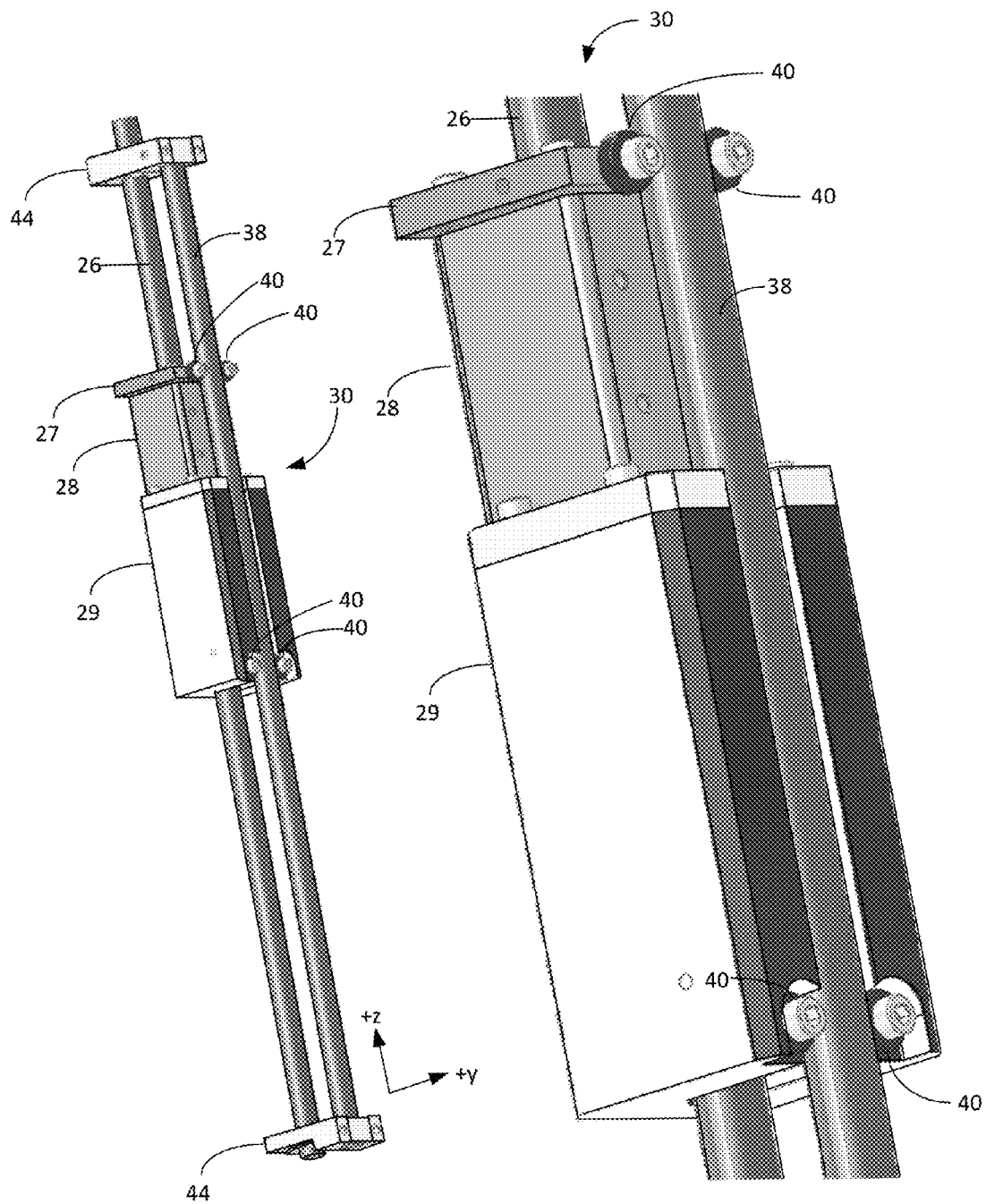
FIG. 3A schematically shows a counterweight and track assembly shown in FIGS. 2A and 2B.
FIG. 3B shows a close-up view of the counterweight and track assembly shown in FIG. 3A.

As better shown in FIGS. 3A and 3B, the counterweight 29 and the mounting plate 27 each have bearings 40 that movably couple them with the second rail 38. Accordingly, the counterweight assembly 30 is considered to slide or move along the outside surface of the second rail 38. FIG. 3F shows a cut-out view of the bearing-and-rail assembly in accordance with illustrative embodiments. The cut-out view corresponds to cross-section A-A of FIG. 3E. The bearings 40 may be a roller, as shown. Other bearings may also be employed, including a ball bearing, air bearing, and magnetic bearings. Alternatively, the bearings 40 may have guiding or keying features to further constraint the counterweight assembly in the various axes. As such, the second rail 38 may have a corresponding shape to the guiding or keying features of the bearings 40.

Figure 3C:
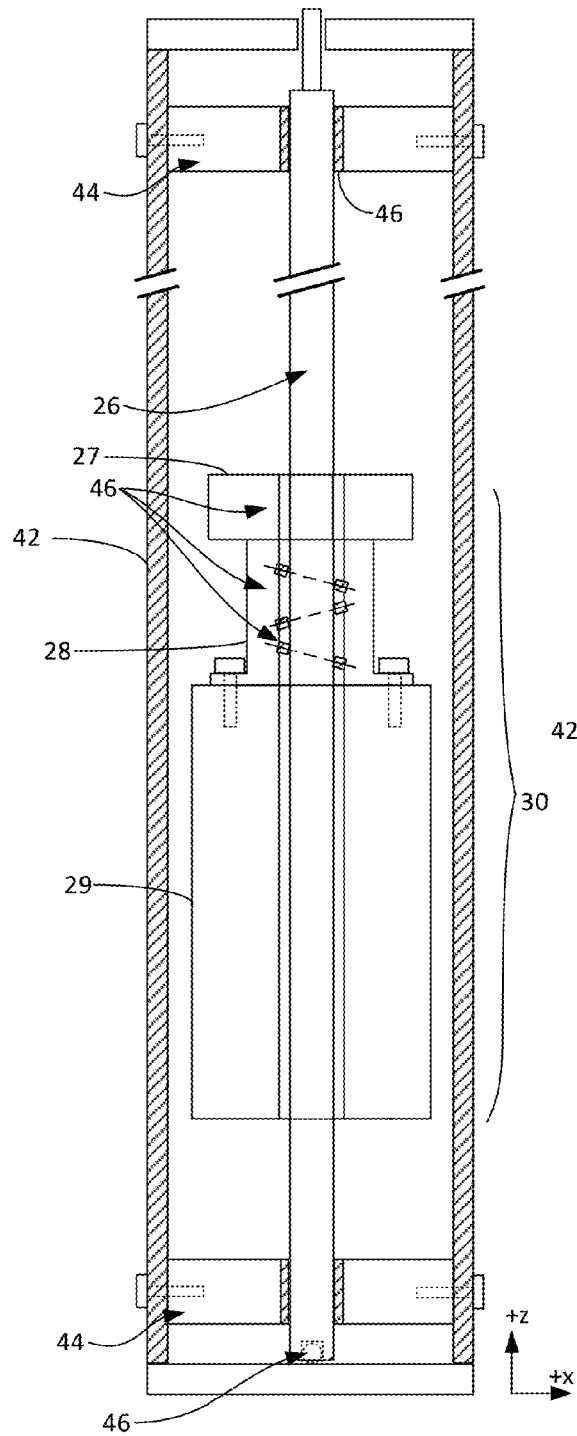
FIG. 3C shows a left-side cut-view of relevant portions of the coordinate measuring machine with the counterweight assembly in accordance with illustrative embodiments.
Figure 3D:
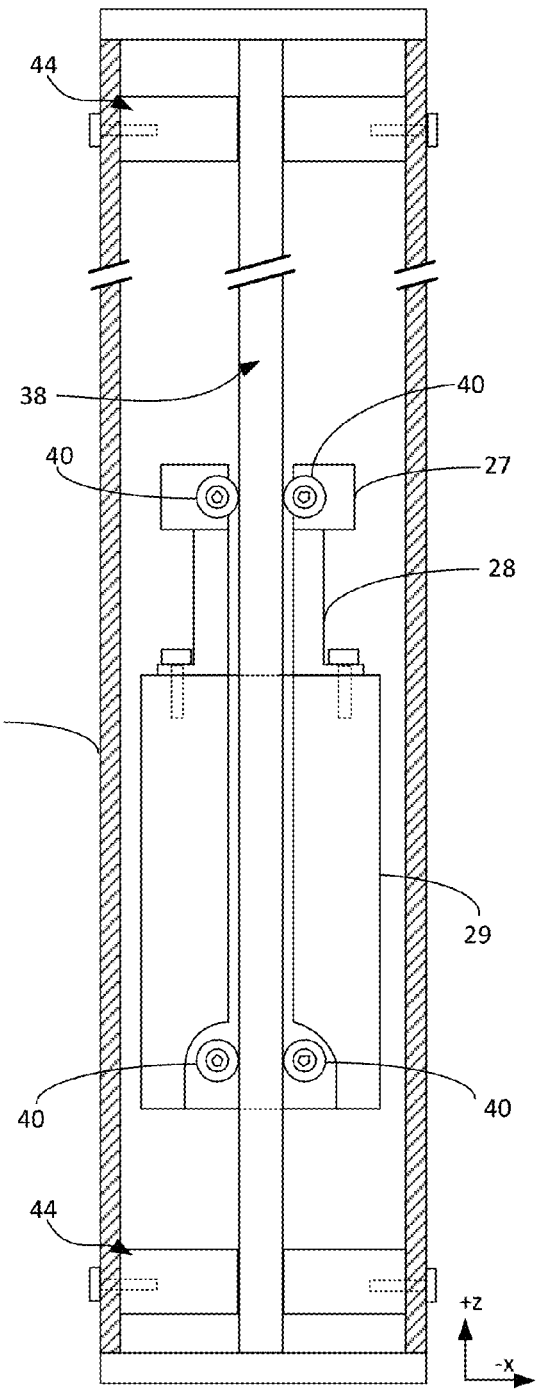
FIG. 3D shows a right-side cut-view of relevant portions of the coordinate measuring machine with the counterweight assembly in accordance with illustrative embodiments.
Figure 3E:
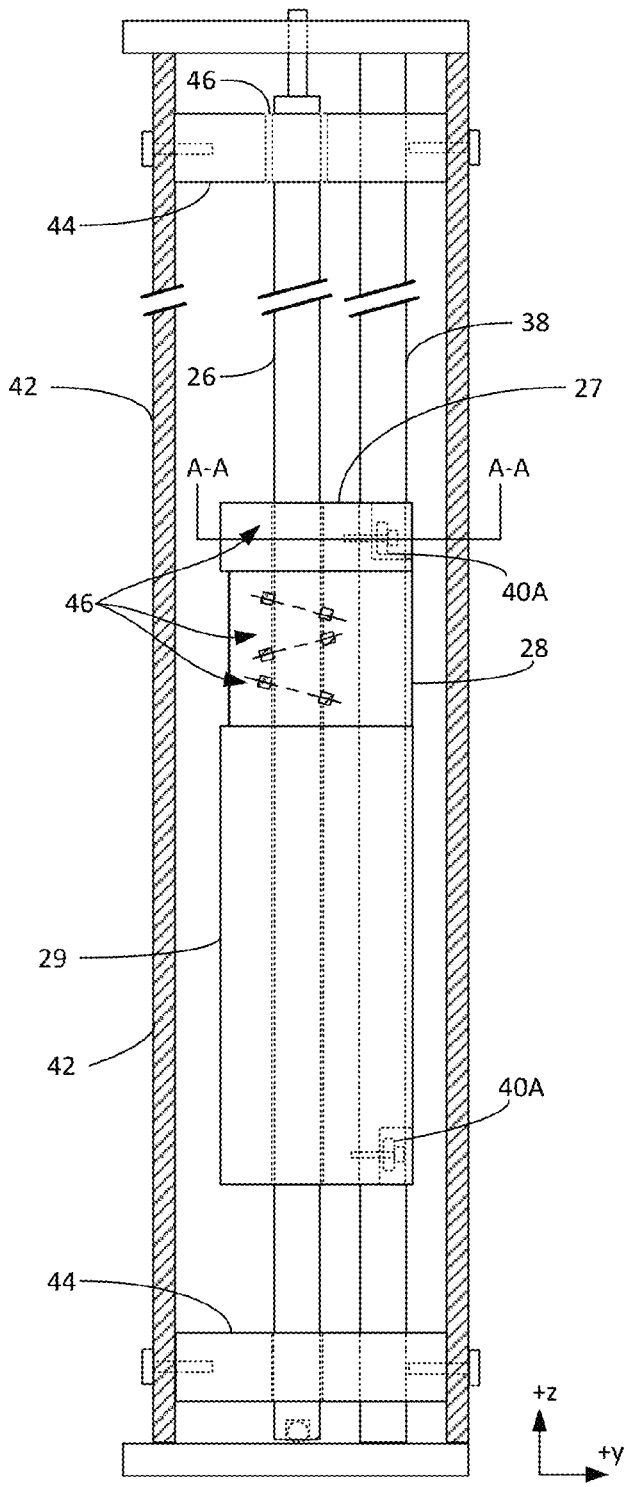
FIG. 3E shows a front-side cut-view of relevant portions of the coordinate measuring machine with the counterweight assembly in accordance with illustrative embodiments.
Figure 3F:
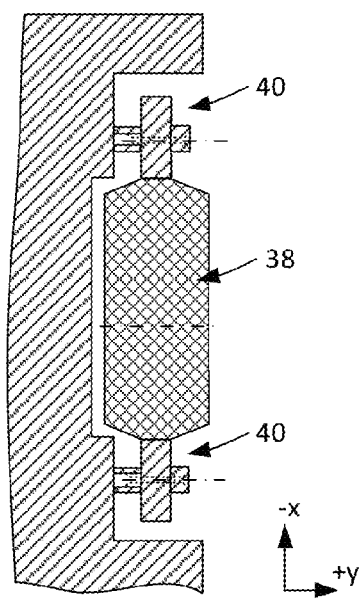
FIG. 3F shows a cut-out view of the bearing-and-rail assembly in accordance with illustrative embodiments.

FIGS. 3C, 3D, and 3E show cut-out views of relevant portions of the CMM with the counterweight assembly 30 in accordance with illustrative embodiments. FIGS. 3C and 3D show the view from the left and right side, respectively, of the assembly while FIG. 3E shows the front view. The assembly 30 may be disposed in a housing 42 that provides attachment regions for the second drive shaft 26 and the second rail 38, which are retained in position by retaining members 44 at the ends thereof. The retaining members 44 may have a bearing or a journal surface 46 to minimize friction with the second drive shaft 26. In an embodiment, the retaining members 44 may include any of various types of bearings, including thrust bearing, ball bearing, and roller bearings. The retaining members 44 may be disposed to the housing 42 by a rivet, welding, bolt, screws, and any of various types of fastening mechanisms. The second shaft drive 26 may be seated on a drive bearing 46 to maintain position in the Z-direction. For illustrative purposes, the rolling rings of the rotary-thrust assembly 28 are shown (see FIGS. 3D and 3E). In FIG. 3E, two of the front bearings 40A are shown in relations the second rail 38.

Figure 4:
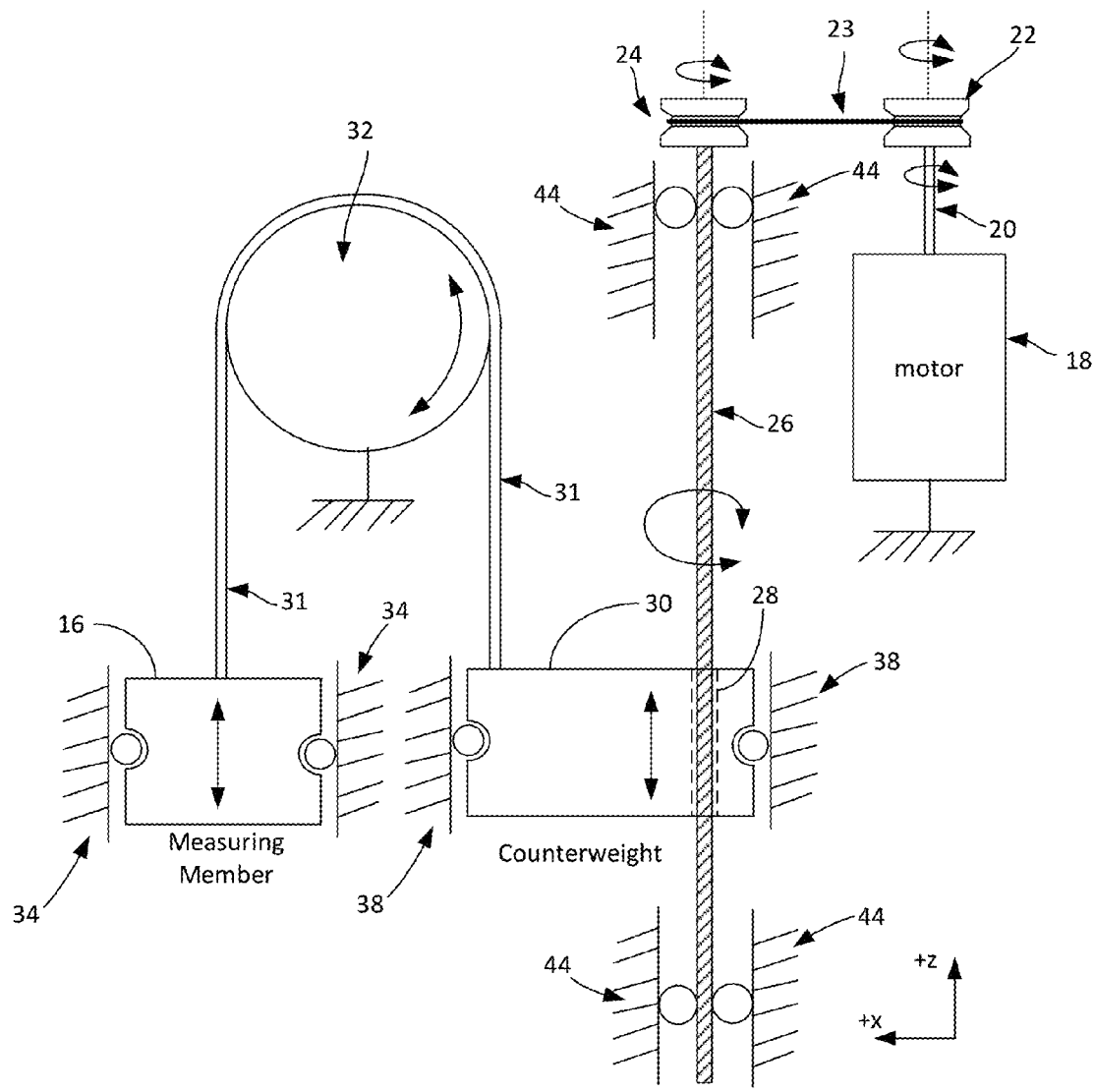
FIG. 4 is a diagram of a scanning apparatus in accordance with illustrative embodiments.

FIG. 4 is a diagram of the scanning apparatus in accordance with illustrative embodiments. During use, the motor 18 rotates the first drive shaft 20, causing the first and second pulleys 22 and 24 through belt 23, to rotate the second drive shaft 26. Rotation of the second drive shaft 26 moves the counterweight 30 up or down substantially parallel with the Z axis along the second rail 38 (shown as a smooth surface acting as a linear guide). The cable 31 extending from the counterweight assembly 30 to the ram 16 consequently transfers this linear motion directly to the ram 16, which also is constrained in its motion by the first rail 34.

The first pulley 22, belt 23, and second pulley 24, as a pulley-assembly, may be configured as a gain to the rotational displacement provided by the motor 18. For example, a first pulley 22 with a radius twice that of a second pulley 24 may reduce the displacement by half (i.e., multiplier of 0.5). The belt 23 may be adapted to decouple the dynamic and static noise (e.g., from stress introduced as a result of the motor vibration, the thermal stresses, mismatched tolerances etc.) between the motor 18 and the rest of the system. As such, the belt-pulley assembly may be employed as a mechanical low-pass filter.

The second drive shaft 26 and rotary-to-thrust assembly 28 may be configured also as a gain to the rotational displacement provided by the motor 18. The pitch value of the rotary-to-thrust assembly 28 may set to be a multiplier in the translation of angular displacement of the second drive shaft 26 to a linear displacement.

The cable 31 may be configured as a high-efficiency isolation transformer. In having the cable 31 provide near normal force and compliance in a single direction, vibration and dynamic noise introduced from the motor 18, external stimuli, and other parasitic motions in the scanning apparatus 6 may be filtered out. Thus, such distortions are isolated from the ram 16 thereby reducing possible errors being introduced into the measurement of the CMM 10. The counterweight-rail system (i.e., the second rail 28 and the bearings 40 of the counterweight assembly 30) constrains the displacement to the Z-direction and may be configured as a limiter of the displacement.

Although the above discussion discloses various exemplary embodiments of the invention, it should be apparent that those skilled in the art can make various modifications that will achieve some of the advantages of the invention without departing from the true scope of the invention. For example, various exemplary embodiments of the invention, though shown in a gantry-type CMM, may be similarly implemented in other types of CMM, including bridge-type, horizontal-type, cantilever-type, and L-bridge bridge.

What is claimed is:

1. A coordinate measuring machine comprising:
    a motor;
    a measuring member;
    a counterweight, the motor coupled with the counterweight, the motor rotating a shaft to cause the counterweight to move in one linear dimension;
    a pulley and cable system coupling the measuring member with the counterweight; and
    a guide track, the counterweight being movably secured to the guide track, the guide track substantially limiting counterweight movement, relative to the motor, to one dimension,
    wherein the cable system substantially reduces errors from the counterweight to the measuring member.

2. The coordinate measuring machine as defined by claim 1, wherein the cable system reduces errors to the measuring member by providing a near normal force and compliance in a single direction.

3. The coordinate measuring machine as defined by claim 1 further comprising a base for supporting an object to be measured, the one dimension being generally orthogonal to the plane of the base.

4. The coordinate measuring machine as defined by claim 1 further comprising a measuring track, the measuring member being coupled with the measuring track to move in one linear dimension.

5. The coordinate measuring machine as defined by claim 1, wherein the measuring member and counterweight are configured to move at substantially equal magnitudes but in opposite directions.

6. The coordinate measuring machine as defined by claim 1, wherein the counterweight is exterior to the guide track.

7. The coordinate measuring machine as defined by claim 5, wherein the guide track has an external surface, the counterweight being configured to movably slide along the external surface of the guide track.

8. The coordinate measuring machine as defined by claim 1, wherein the measuring member comprises a ram and a probe head.

9. The coordinate measuring machine as defined by claim 1, wherein coupling between the measuring member and the counterweight results in the cable being generally vertical.

10. The coordinate measuring machine as defined by claim 1 wherein the guide track includes a rolling ring linear actuator.

11. The coordinate measuring machine as defined by claim 10, wherein the guide track includes a first rail and a second rail, the first rail operatively coupled to the rolling ring linear actuator, and the second rail operatively coupled to a linear guide.

12. The coordinate measuring machine as defined by claim 1, wherein the guide track, when at rest, provides a passive bias for the counterweight and measuring member to restrict movement in the one direction.

13. The coordinate measuring machine as defined by claim 1, wherein the mass of the counterweight and the measuring member is generally the same.

14. A coordinate measuring machine comprising:
a motor;
a measuring member;
a counterweight;
a first pulley and cable system coupling the measuring member with the counterweight;
a second pulley system coupling the motor to a shaft, the motor and second pulley system thereby configured to move the counterweight by rotating the shaft; and
a guide track, the counterweight being movably secured to the guide track, the guide track substantially limiting counterweight movement, relative to the motor, to one dimension,
wherein the first cable system substantially reduces errors from the counterweight to the measuring member.

15. The coordinate measuring machine as defined by claim 14, wherein the second pulley system includes at least two pulleys and a belt disposed therebetween.

16. The coordinate measuring machine as defined by claim 14, wherein the second pulley system includes at least two pulleys and a belt disposed therebetween.

17. A coordinate measuring machine comprising:
a motor;
a measuring member;
a counterweight;
a pulley and cable system coupling the measuring member with the counterweight; and
a guide track, the counterweight being movably secured to the guide track, the guide track substantially limiting counterweight movement, relative to the motor, to one dimension,
wherein coupling between the measuring member and the counterweight results in the cable being non-vertical, and
wherein the cable system substantially reduces errors from the counterweight to the measuring member.

18. The coordinate measuring machine of claim 17, further comprising:
a second pulley system coupling the motor to a shaft, the shaft coupled to the counterweight, the motor and second pulley system thereby configured to move the counterweight by rotating the shaft.

19. The coordinate measuring machine as defined by claim 18, wherein the second pulley system includes at least two pulleys and a belt disposed therebetween.

20. The coordinate measuring machine as defined by claim 18, further comprising a rolling ring linear actuator configured to translate rotation of the shaft to linear motion of the counterweight.

* * * * *